(12) United States Patent
Dolby

(10) Patent No.: US 7,964,052 B2
(45) Date of Patent: Jun. 21, 2011

(54) MOULDING MATERIAL

(75) Inventor: Jeremy Dolby, Brighstone (GB)

(73) Assignee: Gurit (UK) Limited (GB)

( * ) Notice: Subject to any disclaimer, the term of this patent is extended or adjusted under 35 U.S.C. 154(b) by 0 days.

(21) Appl. No.: 10/384,173

(22) Filed: Mar. 7, 2003

(65) Prior Publication Data

US 2003/0175489 A1    Sep. 18, 2003

(30) Foreign Application Priority Data

Mar. 8, 2002    (GB) .................................. 0205498.9

(51) Int. Cl.
*B29C 65/48* (2006.01)
*B32B 37/12* (2006.01)
*B32B 5/12* (2006.01)
*D04H 5/08* (2006.01)

(52) U.S. Cl. ........ 156/231; 156/182; 156/230; 428/113; 428/292.1; 442/381

(58) Field of Classification Search .................. 156/222, 156/224, 228, 283, 307.1, 307.4, 303, 231, 156/246, 249, 330, 272, 182, 307.5, 290, 156/413, 160, 166, 176–177, 179; 264/258, 264/320, 325

See application file for complete search history.

(56) References Cited

U.S. PATENT DOCUMENTS

| | | | |
|---|---|---|---|
| 3,663,344 A | 5/1972 | Brock et al. | |
| 3,790,432 A | 2/1974 | Fletcher et al. | |
| 3,853,656 A * | 12/1974 | McNeely et al. | 156/172 |
| 4,252,593 A * | 2/1981 | Green | 156/231 |
| 4,622,091 A | 11/1986 | Letterman | |
| 5,098,240 A * | 3/1992 | Gapp et al. | 411/424 |
| 5,217,656 A * | 6/1993 | Buckley et al. | 264/490 |
| 5,217,766 A * | 6/1993 | Flonc et al. | 428/34.5 |
| 5,766,534 A | 6/1998 | White et al. | |
| 6,096,669 A * | 8/2000 | Colegrove et al. | 442/366 |
| 6,139,942 A * | 10/2000 | Hartness et al. | 428/298.1 |
| 6,479,413 B1 * | 11/2002 | Booher | 442/101 |
| 7,258,896 B2 * | 8/2007 | Deckard et al. | 427/256 |
| 2002/0053400 A1 | 5/2002 | Lorenz et al. | |
| 2002/0182955 A1 * | 12/2002 | Weglewski et al. | 442/59 |
| 2003/0022582 A1 * | 1/2003 | Cree et al. | 442/394 |

FOREIGN PATENT DOCUMENTS

| | | |
|---|---|---|
| EP | 287103 | 10/1988 |
| EP | 0287103 A2 | 10/1988 |
| EP | 458038 | 11/1991 |
| EP | 475883 | 3/1992 |
| EP | 583090 | 2/1994 |

(Continued)

OTHER PUBLICATIONS

Hexcel Composites News Release dated 2001.

(Continued)

*Primary Examiner* — D. Lawrence Tarazano
*Assistant Examiner* — Ricardo E. Lopez
(74) *Attorney, Agent, or Firm* — MacMillan, Sobanski & Todd, LLC

(57) ABSTRACT

An apparatus for manufacturing a multi-layered preform molding material includes a reinforcement material and a resin material. The apparatus includes a mechanism for joining the reinforcement layers together by impregnation of the resin material into the reinforcement material to form the molding material, thereby obviating the need for any additional bonding to join the individual reinforcement layers before impregnation.

11 Claims, 1 Drawing Sheet

FOREIGN PATENT DOCUMENTS

| | | |
|---|---|---|
| EP | 0583090 A1 | 2/1994 |
| EP | 749825 | 12/1996 |
| EP | 0768167 A2 | 4/1997 |
| EP | 1074369 | 2/2001 |
| EP | 1145841 B1 | 10/2001 |
| EP | 1342544 A1 | 9/2003 |
| EP | 1408152 A1 | 4/2004 |
| GB | 1390859 | 4/1975 |
| JP | 2002249605 A2 | 9/2002 |
| WO | 89/01405 | 2/1989 |
| WO | 8901127 A2 | 2/1989 |
| WO | 9217331 A1 | 10/1992 |
| WO | 9426493 A1 | 11/1994 |
| WO | 9500318 A1 | 1/1995 |
| WO | 9737835 A1 | 10/1997 |
| WO | 9850211 A1 | 11/1998 |
| WO | 00/27632 | 5/2000 |
| WO | 0027632 A1 | 5/2000 |
| WO | 0048821 A1 | 8/2000 |
| WO | 0100405 A2 | 1/2001 |
| WO | 0160605 A1 | 8/2001 |
| WO | 01/68341 | 9/2001 |
| WO | 0168341 A1 | 9/2001 |
| WO | 0228624 A1 | 4/2002 |
| WO | 02081189 A1 | 10/2002 |
| WO | 02088231 A1 | 11/2002 |
| WO | 02090089 A1 | 11/2002 |
| WO | 2004078443 A1 | 9/2004 |

OTHER PUBLICATIONS

Material Specification V90 Spar dated Nov. 21, 2001.
Vestas Purchasing Specification dated Dec. 19, 2001.
"Resin Film Infuser—Composites Cost Reducer" article dated Feb. 2002.
"Automotive Infusion for Composites" article dated May 2001.
Hexfit brochure dated Mar. 2001.
English translation of WO-A-01405, Publication Date, Feb. 23, 1989.
Prepreg Technology, Hexcel Technologies, pp. 1-33 (Jan. 1997).
Purchasing Specification No. 900068 (Dec. 19, 2001), Purchasing Order Entry Printout (Sep. 17, 2002), and Declaration of Martin Kragh (May 21, 2010).
Low Temperature Curing Materials: The Next Generation, SAMPE Journal, vol. 34, No. 5 (Sep./Oct. 1998).

\* cited by examiner

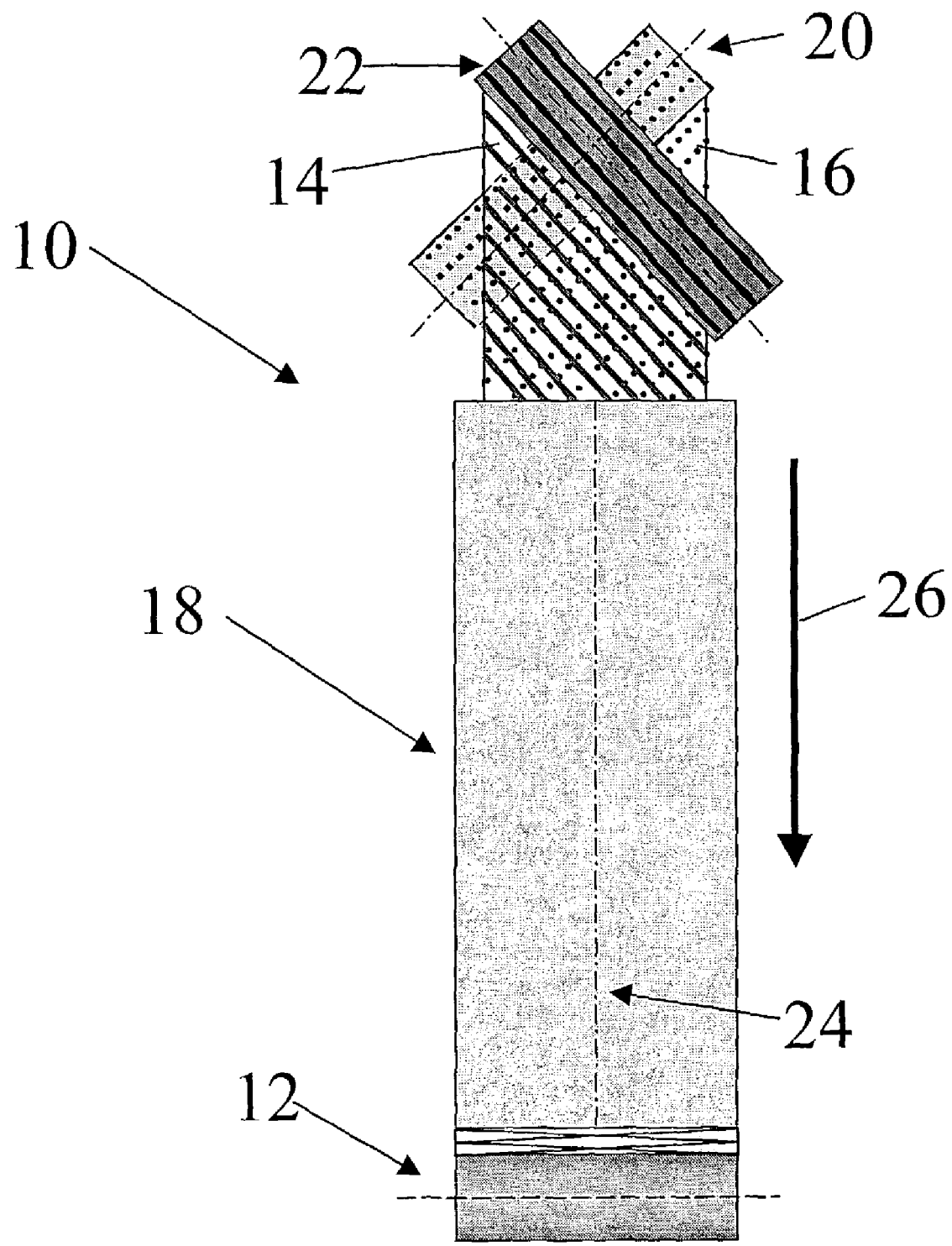

MOULDING MATERIAL

BACKGROUND OF THE INVENTION

The present invention relates to a method of manufacturing a moulding material, an apparatus for manufacturing a moulding material and a moulding material, particularly but not exclusively to a manufacturing method and an apparatus for manufacturing a (partially or fully) preimpregnated moulding material.

Historically, moulded articles or mouldings were formed from a resin material or from a resin material reinforced with a fibrous reinforcement material. Although the moulded products thus formed were satisfactory, it was difficult to guarantee the quality of the moulded products due to the difficulties in controlling the resin/reinforcement ratio. The process was consequently refined such that the supplier of the resin provided the producer of the moulded articles with a preformed, preimpregnated reinforcement material, known as a prepreg moulding material or prepreg which was ready to be applied in the mould and which had the optimal resin/reinforcement ratio for a particular application.

Fibrous reinforcement materials have been available in various forms such as continuous strands, and woven roving format. The continuous strand is a single continuous strand used in wrapping applications. Continuous strands may also be applied in a fabric format, wherein a plurality of parallel, unidirectional structural yarns or fibres are held together by a sewing stitch or knitting stitch which runs perpendicular to the axis of the structural yarns.

A composite material comprising a continuous or uni-axial reinforcement material has high compressive and tensile strength properties in one direction. Unidirectional reinforcement materials usually have their primary fibres in the 0° direction relative to longitudinal axis of the roll from which the material may be supplied. In that case the fibres are perpendicular to the length-wise direction of the fabric, or in other words, the fibres are orientated in a direction along the roll, and this is called a warp unidirectional (UD). The orientation of the fibres can also be at 90° relative to the roll length or parallel to the length direction of the fabric and then the material is called a weft UD.

Woven roving reinforcement is used for high strength laminates having a minimal thickness requirement. Woven roving comprises a plurality of continuous strands running in two directions relative to each other, and held together by weaving the one set of strands with the other. Individual strands are not uni-axial in woven roving fabric.

Many more applications of composites are possible by orientating the fibre directions in directions which are different from the 0° and 90° directions relative to the fabric's longitudinal centreline or lengthwise direction. Additionally, some applications demand high strength in more than one direction, yet not all directions. Hence, a need has developed for a reinforcing material which has variable or multiple directional strength characteristics.

Multi-axial fabrics with yarn orientations which can vary between 0° and 90° relative to the fabric's lengthwise direction are produced by machinery which has been specifically developed for this purpose. These machines comprise weaving looms and stitching heads for assembling the fabric from layers of unidirectional material with fibres in directions which are generally different from 0° and 90° directions. Other machinery for producing multi-axial fabrics is commonly known as "multi-axial weft insertion machines".

As an example, U.S. Pat. No. 4,567,738 discloses a structural multi-axial fabric and a method for making such a fabric. The structural fabric comprises a plurality of substantially parallel uniaxial structural yarns and a secondary yarn or support yarn or web for holding the structural primary yarns in place. The structural yarns are orientated at an angle skewed from both the fabric's centreline and a line perpendicular to the fabric's centreline. A double biased fabric or bi-axial fabric is made by sewing or stitching two skewed fabrics together with the secondary support yarn. In this way, multi-axial fabrics may also be produced by stitching layers of reinforcement material together with different fibre orientations. The stitching or sewing holds the layers of structural yarn together and keeps the fibres in the desired, pre-selected orientation. This is necessary to prevent the multi-axial fabric from distorting during transport and handling.

Such a multi-axial fabric may be utilised as a reinforcement material, and the multi-axial fabric is then impregnated with resin for example in a prepreg machine after stitching to manufacture a multi-axial prepreg. The prepreg machine applies the resin to one or both sides of the multi-axial fabric reinforcement material, and the material is subsequently compressed and heated to allow the resin to impregnate the fabric.

We emphasise here that for a period of at least 20 years, in the production of multi-axial prepregs, it has been common practice to prepare multi-axial fabrics by stitching of individual layers of reinforcement material or by using multi-axial weft insertion machines, followed by impregnation of the stitched fabric in a prepreg machine.

In fact, within the composite materials industry, due to the high costs associated with the preparation of multi-axial fabrics and the complexities of producing these fabrics, fabrics manufacturers have specialised solely in the production of these fabrics.

Since the impregnation of these conventional multi-axial fabrics is also relatively complex, the fabrics manufacturers have supplied unimpregnated stitched fabrics to the resin and moulding materials manufacturers who have subsequently impregnated and supplied the materials in the form of multi-axial prepregs to the end-users.

The relatively long supply chain of multi-axial prepregs renders the end-cost of a multi-axial prepreg material relatively high. Up until now, the application of multi-axial prepregs has therefore been on a relatively small scale.

In addition, known multi-axial fabrics have various important disadvantages which have further limited their application up until now. The presence of stitching or binders affects the mechanical properties of the multi-axial reinforcement fabric, as the fibres or yarns may be damaged or displaced by the stitching process. Furthermore, drilling and machining of composite structures with incorporated stitching has been problematic due to the softening of stitchings. Usually a relatively soft polyester fibre is used for stitching which, in combination with a reinforcing material which is of a non-polyester material, can affect the quality and mechanical properties of the cured material.

Also, the impregnation speeds of fabrics produced on multi-axial weft insertion machines tend to be low. This is due to the tight bundling of yarns as a result of the stitching operation. This further increases the cost of multi-axial prepregs. Finally, the stitching and the tight bundling of the fibres make the materials inherently stiff which can affect the drape of the material. This in turn can make the lay-up of the material in complex moulds more difficult.

It is therefore desirable to provide an improved method of manufacturing multi-axial prepreg material and to provide an improved apparatus for manufacturing such a material and to provide an improved multi-axial moulding material, thereby addressing the above described problems and/or which offer improvements generally.

SUMMARY OF THE INVENTION

According to the present invention, there are provided a method of manufacturing a moulding material, an apparatus for manufacturing a moulding material and a moulding material as defined in any of the accompanying claims.

In an embodiment of the invention, there is provided a method of manufacturing a preform moulding material comprising multiple layers of a reinforcement material, the method comprising the steps of providing individual layers of a fibrous reinforcement material, providing a reinforcement resin material, providing means for joining the layers. The method further comprises the single step of joining the individual not-yet-joined layers of reinforcement material together by bringing the not-yet-joined layers of reinforcement material in contact with each other and simultaneously at least partially impregnating the individual layers of the reinforcement material with the resin material to form the moulding material thereby obviating the need for an additional bonding means to join the individual reinforcement layers before impregnation.

In this way it is achieved that the reinforcement layers are joined by the resin which obviates the need for stitching or other forms of bonding the reinforcement layers before resin impregnation. This greatly improves the efficiency of producing preform moulding materials and significantly reduces the cost of these materials, particularly of multi-axial prepregs.

Also, as joining takes place in a single step, whereby there is no need to superpose or conjoin the reinforcement layers before the resin is applied, the efficiency of the manufacturing method is further increased and the complexity of the method is greatly reduced.

Finally, the simultaneous steps of bringing the not-yet-joined layers of reinforcement material in contact with each other and impregnating the individual reinforcement layers prevents distortion of the reinforcement material layers and more importantly distortion of the selected or desired fibre orientation of the reinforcement material during forming of the preform moulding material.

The resin material has essentially two functions: it joins the individual reinforcement layers to form the preform moulding material and it retains the orientation of the reinforcement fibres of each individual reinforcement layer.

Particularly "sleezy fabrics" as described below such as unidirectional reinforcement fabrics, are easily distorted during handling, transport, stitching and impregnation whereby individual fibre tows are displaced. This results in reduced mechanical performance of the cured prepreg product which incorporates these fabrics. The simultaneous step of conjoining and impregnation of the layers to bond the layers by the resin overcomes this important problem.

The impregnation of the reinforcement layers may comprise the steps of pressing the resin into the reinforcement fabric material whereby the resin may be further heated. This promotes the flow of the resin into the fibres, as the viscosity of the resin decreases with an increase in temperature.

Within the context of the application the term "individual layers" refers to the property of the layers that the layers are separate and that before impregnation of the layers, the layers are not interconnected or joined in any way and remain separate.

In one embodiment of the invention, the resin material is applied to at least one of the adjoining surfaces of the fibrous reinforcement material to form a partially preimpregnated preform moulding material. In this embodiment, the resin is applied on an internal surface of the reinforcement material. Sufficient resin material may be applied to the internal surface of the reinforcement material to fully impregnate this material.

In another embodiment of the invention, the resin material is applied to the external surface or surfaces of the external reinforcement layer or layers, and the reinforcement material is impregnated inwards with the resin material to join the layers of reinforcement material and to thereby form the moulding material. The reinforcement material layers may be fully or partially impregnated in this way.

In another embodiment of the invention, there is provided a method of manufacturing a multi-layered preform moulding material comprising layers of a reinforcement material and a resin material. The method may comprise the step of joining the layers together by impregnation of the resin material into the reinforcement material to form the moulding material thereby obviating the need for any additional bonding means to join the individual reinforcement layers before impregnation. In an embodiment, no bonding means such as stitching or polymeric binders are necessary to join or bond the reinforcement fabric or the individual reinforcement fibres.

In a further embodiment, the joining means may comprise a prepreg machine and the individual layers may be applied to the prepreg machine to form the resin impregnated moulding material. In the context of this application, any pre-impregnation machine, such as the machines conventionally used in the fabrication of pre-impregnated moulding materials, is suitable for forming the moulding material without the need for stitching of the reinforcement fabric layers or any alternative bonding means before impregnation takes place.

In another embodiment of the invention, the resin material may be applied to each reinforcement layer. The reinforcement material may comprise a fibrous material comprising unidirectional fibres. Suitable means may be provided for orientating the direction of the fibres or yarns before the resin material is applied to the reinforcement material.

By applying some form of tension or force to the fabric, the fibres or yarns of the reinforcement fabric may be moved in a desired direction or to a desired angle relative to the length-wise direction of the fabric or the longitudinal axis of the joining means. This is often termed as skewing. The orientating means may comprise means for skewing the reinforcement material before the application of the resin material.

In an embodiment, the reinforcement material may comprise a unidirectional fibrous reinforcement material comprising a warp and a weft. The weft may be formed by the structural fibres which may be orientated perpendicular to the direction of the warp. The warp or support web may extend in the length-wise direction of the reinforcement fabric. The reinforcement material may be fed to the joining means in a direction approximately parallel to the warp. Alternatively, in order to skew or orient the direction of the weft, the material may be fed to the joining means at a selected angle relative to the joining means.

In another embodiment of the invention, there is provided a method of manufacturing a preform moulding material comprising a resin material and multiple layers of a reinforcement material, the method comprising the steps of providing individual layers of a reinforcement material, providing a reinforcement resin material, providing a means for joining the layers, the method further comprising the step of joining the individual layers of the reinforcement material. The joining means may comprise means for locating the resin material between layers of the reinforcement material, the inherent tack of the resin material holding the reinforcement material in place, thereby forming the moulding material.

In another embodiment of the invention, the reinforcement material is partially impregnated with the resin material. This enables venting of inter- and intra-laminar gases out of the moulding material during processing of the moulding material.

In another embodiment of the invention, there is provided an apparatus for manufacturing a preform moulding material according to a method as hereinbefore described.

In a further embodiment, there is provided an apparatus for manufacturing a preform moulding material comprising a reinforcement material and a resin material, the apparatus comprising means for joining the reinforcement layers together by impregnation of the resin material into the reinforcement material to form the moulding material thereby obviating the need for any additional bonding means to join the individual reinforcement layers before impregnation.

In yet another embodiment, the apparatus may comprise supply means (such as rolls or carriages) for supplying fibrous reinforcement material, the supply means being located at a suitable distance from the joining means to obviate the need for bonding means (such as stitching) to hold the individual reinforcement layers in place relative to one another and/or to hold the fibres of a reinforcement layer in place. As discussed hereinbefore, by reducing handling and transport of the reinforcement material, a moulding material may be formed in which the resin matrix joins and holds the individual fabric layers and retains the orientation of the fibres of each layer. Thus, by locating the supply means in relative close proximity to the joining means, handling, support and transport of the reinforcement fabric is minimised so that distortion of the fabric does not occur. The distance between the supply means and the joining means is such that distortion of the reinforcement material is prevented. Preferably, the reinforcement material is fed directly into the joining means.

In a further embodiment, the apparatus may comprise means for orientating the direction of the fibres of the reinforcement material. The orientating means may comprise a skewing means for skewing the reinforcement material before the application of the resin material. The orientating means may comprise selection means for selecting the orientation of the reinforcement material before impregnation. The orientation of the fibres of at least one of the reinforcement layers may differ from another reinforcement layer. In this way, the mechanical properties of the cured moulding material may be adapted to a specific application.

In an embodiment, the apparatus may comprise fabric tensioning means for tensioning the reinforcement fabric layer. The reinforcement layer may be tensioned to enable skewing of the material. Skewing may be achieved by aligning the source of the reinforcement material at an angle relative to the longitudinal axis of the joining means. In this way, the reinforcement fibres may be orientated in a desired direction. The material may be tensioned or skewed by means of rollers and/or by locating the joining means at an angle relative to the longitudinal axis of the joining means. Upon tensioning the material by feeding the material into the joining means, the material is skewed and the weft is positioned at a desired angle relative to the length-wise direction of the preform moulding material.

In an embodiment of the invention, the fabric of each individual layer may comprise further separate reinforcement fabrics which may or may not be stitched together or which may or may not be joined by impregnation. In this way, a preform moulding material may be formed from conventional multi-axial prepreg layers, individual reinforcement layers, and multi-axial preforms as hereinbefore described or combinations of the aforesaid layers.

In a further embodiment of the invention there is provided an apparatus for manufacturing a preform moulding material comprising a reinforcement resin material and multiple layers of a fibrous reinforcement material, the apparatus comprising a means for joining the individual layers, the joining means comprising an application means for applying the resin material onto a reinforcement layer or layers, the joining means further comprising a means for locating the reinforcement material onto the resin material to form the moulding material. The inherent tack of the resin material then holds the reinforcement layer in place and retains the orientation of the reinforcement fibres.

In yet another embodiment, there is provided a moulding material which is manufactured by means of a method as hereinbefore described and/or by means of an apparatus as hereinbefore described.

In a further embodiment of the invention, there is provided a preform moulding material wherein the orientation of the fibres of at least one of the reinforcement layers differs from the orientation of the fibres of another reinforcement layer. In this way, a multi-axial prepreg is provided. In a preferred embodiment, the reinforcement layer comprises a unidirectional fibrous reinforcement material and the orientation of the fibres of at least one of the reinforcement layers differs from the orientation of the fibres of another reinforcement layer.

The orientation of the fibres may vary anywhere between an angle of $-90°$ relative to the lengthwise direction of the reinforcement fabric layer to an angle of $+90°$ relative to the lengthwise direction of the reinforcement fabric layer (anywhere between being parallel to the longitudinal axis of a roll from which the material may be supplied and being perpendicular to the longitudinal axis of a roll from which the material may be supplied). Preferably the fibre orientation in one unidirectional reinforcement layer of the moulding material is at an angle of $-45°$ and the fibre orientation is at an angle of $+45°$ in another unidirectional layer (i.e. orientations as shown in FIG. 1).

There is thus provided a method for manufacturing a moulding material, an apparatus for manufacturing a moulding material and a moulding material according to the embodiments of the invention.

Multi-axial, multi-layered preform resin impregnated moulding materials comprising individual layers of a reinforcement fabric are conventionally produced by impregnating prejoined layers of reinforcement fabrics. The layers are prejoined or interconnected by stitching or by alternative binders. Since the production of the multi-layered fabric is complex, the production of multi-axial fabrics on the basis of conventional techniques increases the cost of such prepregs.

We have discovered that unimpregnated or dry multi-axial, multi-layered preform moulding materials comprising individual not-yet joined or not-yet interconnected layers may be directly impregnated with a resin material whereby the resin binds the individual reinforcement fabric layers. This obviates the requirement for additional bonding techniques such as stitching or resin binders. We have further found that the resin material has essentially two functions: it joins the individual reinforcement layers to form the preform moulding material and it holds the orientation of the reinforcement fibres of each individual reinforcement layer.

We also found that if handling and transport of the individual reinforcement fabrics or weft precursors is reduced, there is no need to bond (for example by stitching) to join the individual layers before impregnation, since the reduced handling prevents the fabrics from being distorted.

In an embodiment, the reinforcement material which is incorporated in the resulting moulding material may be made up of two or more substantially parallel uniaxial fabrics comprising a support web or warp and a weft. These fabrics are generally termed as "weft precursors" as the structural fibres are generally aligned at 90° to the web direction. The weft precursors may be produced primarily on weaving looms, but may also be produced on a weft insertion machine or similar machine. As described below, weaving looms have advantages over multi-axial weft insertion machines in that larger fibre bundles may be used. Also, weft precursors produced on weaving looms are generally of lower cost.

The reinforcement fibrous material may comprise fibres in the form of polyester, glass, carbon, aramid and other polymer materials including combinations thereof. The fibrous material may also comprise natural fibrous materials such as jute which may or may not be combined with man-made materials.

The unimpregnated or resin free reinforcement material may be supplied on a carriage or a roll. The fibrous reinforcement may comprise fibres in a direction perpendicular to the central axis of the carriage or roll on which the material is supplied.

In an embodiment, a lightweight warp fibre may be used to provide integrity to the weft precursor. This warp, when woven, may be of plain, twill or other weave style. The fibre incorporated as the warp may preferably be of the same material as the weft. For some applications, the warp fibre utilised may be of similar areal weight (mass of fabric per surface area [$kg/m^2$]), or of greater areal weight than the weft. The warp fibres within the weft precursor provide tensional strength and stiffness to allow the fabric to be processed through an impregnation process such as through a conventional prepreg machine.

In an embodiment of the invention, the resin material matrix which joins the individual reinforcement layers, may be of thermoset or thermoplastic polymeric material such as an epoxy, vinylester, polyester, phenolic, BMI, acrylic, polyimide or similar. The fibres may be fully, partially or not impregnated after processing. A wide range of fibre orientations (ranging typically from +20° to +90° and −90° to −20° relative to the length-wise direction or roll) is possible by changing the angles of the carriages. More than two carriages may be employed to make materials with three or more axes. Additional yarns supplied from a beam, rack or creel can be fed in simultaneously to the skewing and impregnation (prepreg) process to provide 0° reinforcement to the material.

In a further embodiment, each individual reinforcement layer may each comprise further multiple reinforcement fabric layers which may be joined by any suitable means including stitching and/or impregnation of the further layers by a method and/or apparatus as hereinbefore described. This allows manufacture of large assemblies of preform moulding materials by subsequent impregnation.

Generally, weft precursor unidirectional (UD) reinforcement material may be skewed before it is joined to other reinforcement layers. There are various ways of achieving this. The let-off stations or supply stations providing the weft UD precursor may be at an angle to the main axis of the prepreg machine. Alternatively, sets of rollers or other suitable means may apply different tensions on either side of the UD material which causes the material to skew.

The method and process as hereinbefore described has various important advantages over conventional methods for producing multi-layered preform moulding materials.

An important advantage is that the cost of producing multi-layered preform moulding materials or multi-layered prepregs is significantly reduced since the method as hereinbefore described obviates the need for joining the layers together before impregnation takes place. In an embodiment of the invention, the merging of the fibres takes place concurrently with the impregnation or prepreg process.

A further advantage is that larger fibre bundles of a higher tex may be used to produce a woven weft precursor than the fibre bundles that are usually incorporated to produce a fabric of similar areal weight on a multi-axial weft insertion machine (unit 'tex' is commonly used to indicate the mass of the yarn in grams per 1000 m). We have found that there is no limited to the area weight of the fabric that may be formed by using the method as herein described. In a woven weft precursor, the flat and well-spread fibre characteristics produce good coverage with no gaps. Multi-axial weft insertion machines use a more expensive, lower tex fibre to obtain the same degree of fibre coverage. Also, weaving looms operate at a generally lower cost in the production of weft precursors than multi-axial weft insertion machines.

Furthermore, the impregnation speeds are greatly increased. Yarns within multi-layer fabrics produced on multi-axial weft insertion machines tend to be bundled tightly during the stitching operation. This slows down the impregnation speed. Due to the absence of stitching, in an embodiment of the invention, the moulding material may be impregnated at a much higher production speed. This significantly reduces the production costs of these materials. Also, in comparison to a conventional multi-layer prepreg, for similar impregnation speeds, the multi-axial material of the present invention has a superior quality.

A further advantage is that any stitching is eliminated. This greatly improves the mechanical and machining properties of the processed material.

The inclusion of stitching and in particular of polyester stitching yarn in multi-axial weft insertion machines is widely viewed as parasitic and undesirable. Drilling and machining of composite structures with incorporated polyester stitching has been problematic due to the softening of the polyester stitching. Also, in the cured multi-axial material, voids are commonly found around the stitching points. This affects the structural properties of the material. Furthermore, voids are caused by the bundling of the fibres by the stitching which results in a less homogenous fibrous layer in comparison with the prepreg according to an embodiment of the invention.

Materials produced in accordance with the method of the invention exhibit superior properties with respect to conformability within complex tooling curvatures in a moulding process. The absence of stitching and other binders allows the material to conform better to the shape and curvature of complex moulds.

BRIEF DESCRIPTION OF THE DRAWINGS

The invention will now be described by way of example only, and with reference to the sole accompanying drawing, which presents a diagrammatic view of an apparatus for manufacturing a bi-axial preform moulding material.

DETAILED DESCRIPTION OF THE PREFERRED EMBODIMENT

The apparatus 10 is adapted to manufacture a bi-axial preform moulding material comprising a reinforcement resin material and two layers 14,16 of a reinforcement material. The apparatus 10 comprises a means for joining the individual layers 14,16 in the form of a prepreg machine 18. The prepreg machine 18 conducts the simultaneous steps of bringing the reinforcement layers and resin material in contact with each other and impregnating the reinforcement layers to thereby join the reinforcement layers and form the moulding material 12. The direct impregnation of the reinforcement layers 14,16 obviates the need for any additional bonding means such as binders or stitchings before the impregnation stage.

Each reinforcement fabric layer 14,16 is provided on a roll or carriage 20,22 and comprises substantially parallel uniaxial fibres. The fibres are arranged parallel to the longitudinal axis of the roll or carriage 20,22 (weft UD) and perpendicular to the length-wise direction of the fabric. The uniaxial fibres are supported by a web in the form of lightweight warp fibres. This fabric is often described as a "sleezy fabric" as the direction of the fibres or yarns can be easily changed by applying tension to the fabric.

The rolls 20,22 are situated at respective angles of +45° and −45° relative to the central axis 24 of the machine 18. The feed of the fabric 14,16 into the machine 18 tensions the fabric which causes the fabric 14,16 to skew so that the orientation of the fibres is at a −/+45° angle relative to the longitudinal axis 24 of the machine 18. If alternative fibre angles are required, the rolls may be orientated at different angles relative to the feed of the machine 18. Alternatively, the fabric may be skewed by the application of alternative tensioning means such as angled guide rollers (not shown here). This obviates the need for positioning the carriages at specific angles.

In use, the reinforcement fabric layers 14,16 are unwound from their respective rolls 20,22 and the layers 14,16 are fed into the impregnation or prepreg machine 18 via the primary nip rollers (not shown) of the machine 18. The first layer 14 is unwound at an angle of 45° relative to the central axis of the machine 18 and the second layer 16 is unwound at an angle of −45° relative to the central axis 24 of the machine 18. As the fabrics 14,16 leave their respective carriages, the fibres skew to an angle dictated by the carriage angle in relation to the central axis 24 of the machine 18. The separate layers 14,16 travel subsequently through the impregnation process at the desired angle whereby the direction of prepreg manufacture is indicated by arrow 26. Due to the pressure within the impregnation process the accuracy of the fibre orientation is maintained. In this way the preform moulding material is formed. The resin matrix thereafter maintains the fibres at the desired angles until end use of the preform moulding material, due to the characteristic high viscosity of the resin material matrix.

What is claimed is:

1. A method of manufacturing a moulding material having multiple layers of a reinforcement material, the method comprising the steps of:
   providing individual layers of a fibrous reinforcement material,
   providing a reinforcement resin material,
   providing a means for orientating the direction of the fibres, the orientating means comprises a skewing means for skewing the reinforcement material, and
   simultaneously (1) bringing the individual layers of the reinforcement material into contact with each other and with the reinforcement resin material, the fibres being oriented by the orienting means before joining the layers to form the moulding material and (2) at least partially impregnating the individual layers of the reinforcement material with the reinforcement resin material to form the moulding material.

2. A method according to claim 1, wherein the resin material is applied to at least one of the conjoining surfaces of the fibrous reinforcement material layers to form a partially pre-impregnated preform moulding material.

3. A method according to claim 1, wherein the resin material is applied to the external surface or surfaces of the external reinforcement layer or layers, and the reinforcement material is impregnated inwards with the resin material to join the layers of reinforcement material and to thereby form the moulding material.

4. A method according to claim 1, wherein the resin material is applied in the form of an individual resin layer, the method comprising the step of bringing the not-yet-joined layers of resin in contact with the not-yet-joined layers of reinforcement material to join the layers and form the moulding material.

5. A method according to claim 1, wherein one or more layers of the reinforcement material comprises unidirectional fibres.

6. A method according to claim 1, wherein the simultaneous steps of bringing the not-yet-joined layers of reinforcement material in contact with each other and at least partially impregnating the individual reinforcement layers with the resin material to form the moulding material prevent distortion of the reinforcement material layers.

7. A method according to claim 1, wherein the individual layers of the reinforcement material are each supplied from a respective supply means which is provided at a suitable distance from a location at which the individual layers of the reinforcement material are brought into contact with each other and with the reinforcement resin material.

8. A method according to claim 1, wherein the orientation of the fibres forming the moulding material is pre-determined or selected.

9. A method according to claim 1, wherein the fibres in a first one of the individual layers of a fibrous reinforcement material are oriented at a first angle, and wherein the fibres in a second one of the individual layers of a fibrous reinforcement material are oriented at a second angle that is different from the first angle.

10. A method according to claim 1, wherein the fibres in a first one of the individual layers of a fibrous reinforcement material are oriented at a first angle, and wherein the fibres in a second one of the individual layers of a fibrous reinforcement material are oriented at a second angle that is opposite from the first angle.

11. A method according to claim 1, wherein the fibres in a first one of the individual layers of a fibrous reinforcement material are oriented at a first angle, and wherein the fibres in a second one of the individual layers of a fibrous reinforcement material are oriented at a second angle that is equal and opposite from the first angle.

* * * * *